(12) United States Patent
Wilton et al.

(10) Patent No.: US 9,884,547 B1
(45) Date of Patent: Feb. 6, 2018

(54) MANUAL TRANSMISSION WITH ELECTRIC MOTOR INPUT

(71) Applicant: GM Global Technology Operations LLC, Detroit, MI (US)

(72) Inventors: Daryl A. Wilton, Macomb, MI (US); James M. Hart, Belleville, MI (US); Darrell Lee Robinette, Dollar Bay, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/296,696

(22) Filed: Oct. 18, 2016

(51) Int. Cl.
| | |
|---|---|
| *F16H 48/06* | (2006.01) |
| *B60K 6/365* | (2007.10) |
| *F16H 3/72* | (2006.01) |
| *F16H 37/04* | (2006.01) |
| *B60K 6/547* | (2007.10) |
| *B60K 6/48* | (2007.10) |

(52) U.S. Cl.
CPC .............. *B60K 6/365* (2013.01); *B60K 6/48* (2013.01); *B60K 6/547* (2013.01); *F16H 3/725* (2013.01); *F16H 37/042* (2013.01); *F16H 48/06* (2013.01); *B60Y 2200/92* (2013.01); *B60Y 2400/73* (2013.01); *F16H 2200/0034* (2013.01); *F16H 2200/2005* (2013.01); *F16H 2200/2064* (2013.01); *F16H 2200/2094* (2013.01); *F16H 2200/2097* (2013.01); *Y10S 903/902* (2013.01)

(58) Field of Classification Search
USPC ............................................................ 475/5
See application file for complete search history.

(56) References Cited

U.S. PATENT DOCUMENTS

| | | | |
|---|---|---|---|
| 6,558,283 B1 * | 5/2003 | Schnelle ................... | B60K 6/36 180/65.235 |
| 6,685,591 B2 * | 2/2004 | Hanyu ...................... | B60K 6/36 180/65.225 |
| 6,896,635 B2 * | 5/2005 | Tumback ............... | B60K 6/365 180/65.25 |
| 8,251,848 B2 * | 8/2012 | Murakami .............. | F16H 3/728 475/5 |
| 9,682,614 B2 * | 6/2017 | Lee .......................... | B60K 6/36 |

* cited by examiner

*Primary Examiner* — Dirk Wright
(74) *Attorney, Agent, or Firm* — Harness, Dickey & Pierce, P.L.C.

(57) ABSTRACT

A vehicle powertrain includes an engine having a drive shaft. A manual transmission includes an input shaft drivingly connected to the drive shaft and includes a plurality of input gears. A main shaft includes a plurality of driven gears engaged with the input gears and including an output gear that is engaged with a differential. An electric motor is connected through a planetary gear set to a transfer gear on the main shaft.

8 Claims, 6 Drawing Sheets

MANUAL TRANSMISSION WITH ELECTRIC MOTOR INPUT

FIELD

The present disclosure relates to a vehicle powertrain having a manual transmission and electric motor input.

BACKGROUND

This section provides background information related to the present disclosure which is not necessarily prior art.

Hybrid vehicles may operate in an electric only drive configuration, in which an electric motor provides the drive torque to a transmission to power the vehicle, or may alternatively operate in a hybrid drive configuration, in which either the electric motor and/or an internal combustion engine may be engaged to provide the drive torque to the transmission. When operating in the electric only drive configuration, the internal combustion engine must be disconnected from the electric motor and the transmission so that the electric motor does not transfer torque to the internal combustion engine. When operating in the hybrid drive configuration, the electric motor and the internal combustion engine may be coupled together and/or coupled to the transmission to transmit torque therebetween.

The transmission includes a gearbox that provides a plurality of different gear ratios used to alter a speed and/or torque output from the transmission to the drive wheels of the vehicle. Manual transmissions are more efficient than automatic transmissions due to the energy loss associated with a torque converter of the automatic transmissions. Accordingly, a hybrid vehicle utilizing a manual transmission may be more fuel efficient than the same hybrid vehicle utilizing an automatic transmission. However, the manual transmission, when positioned in a drive gear, is rotationally fixed to the torque providing source, e.g., the internal combustion engine. As noted above, when operating in the hybrid drive configuration, the internal combustion engine must be disconnected from the electric motor and the transmission.

SUMMARY

This section provides a general summary of the disclosure, and is not a comprehensive disclosure of its full scope or all of its features.

A vehicle powertrain includes an engine having a drive shaft. A manual transmission includes an input shaft drivingly connected to the drive shaft and includes a plurality of input gears. A main shaft includes a plurality of driven gears engaged with the input gears and including an output gear that is engaged with a differential. An electric motor is connected through a planetary gear set to a transfer gear on the main shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
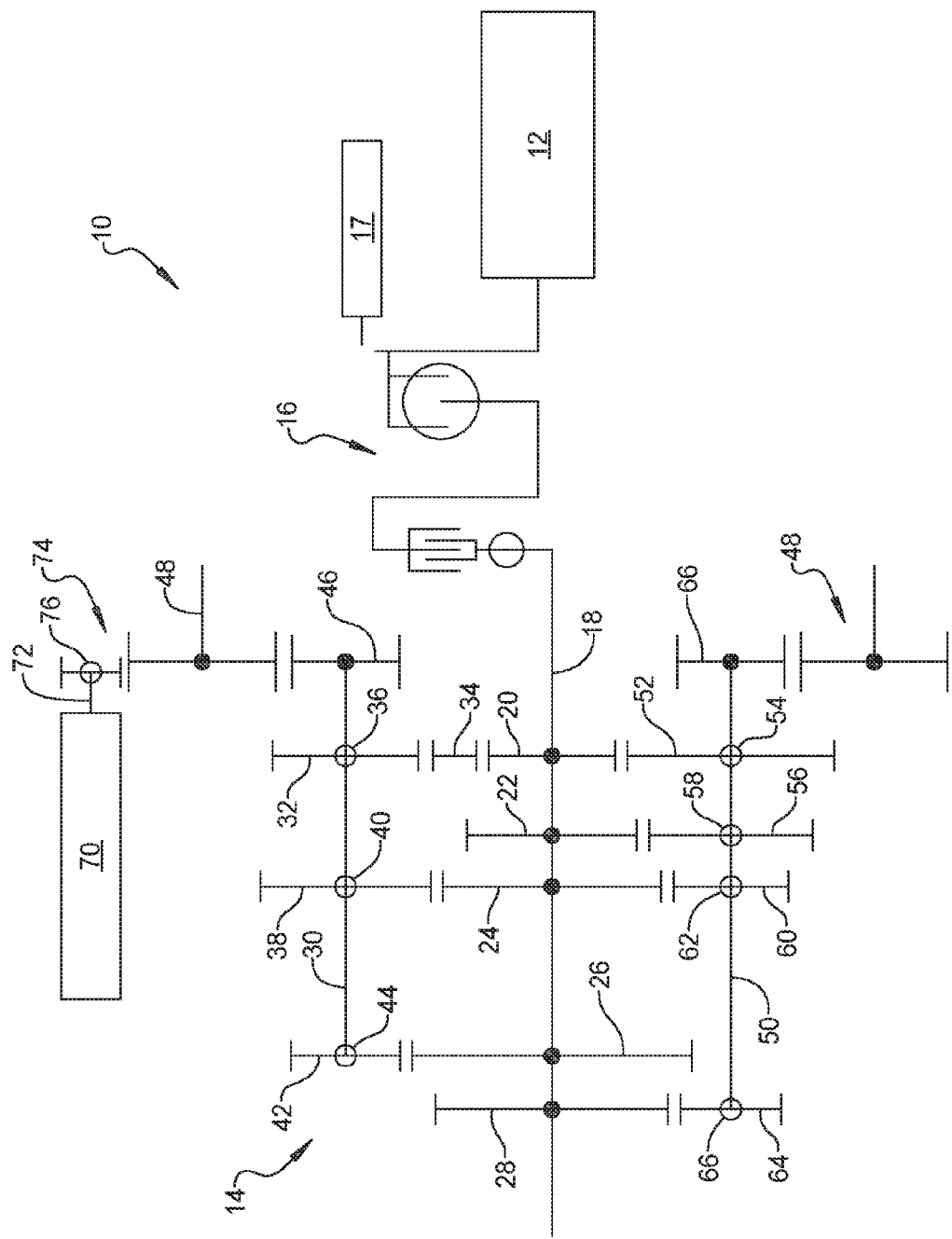
FIG. 1 is a schematic view of a vehicle powertrain with an engine and manual transmission with an electric motor input.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle powertrain 10 is shown including an engine 12 drivingly connected to a manual transmission 14 via a launch clutch and dual mass flywheel system 16. The engine can include a starter motor 17. The manual transmission 14 includes an input shaft 18 that includes a $1^{st}$ gear input gear 20, a $2^{nd}$ gear input gear 22, a $3^{rd}/5^{th}$ gear input gear 24, a $4^{th}$ gear input gear 26, and a $6^{th}$ gear input gear 28. An upper main shaft 30 is provided with a reverse gear 32 that engages the $1^{st}$ gear input gear 20 via a reverse idler gear 34. The reverse gear 32 is selectively engageable to the upper main shaft 30 by a synchronizer 36. A $3^{rd}$ gear driven gear 38 is provided on the upper main shaft 30 and is selectively engageable thereto by a synchronizer 40. A $4^{th}$ gear driven gear 42 is provided on the upper main shaft 30 and is selectively engageable thereto by a synchronizer 44. The upper main shaft 30 includes an output gear 46 that can be in driving engagement with an output member such as a differential 48.

A lower main shaft 50 is provided with a $1^{st}$ gear driven gear 52 that engages the $1^{st}$ gear input gear 20 and is engageable to the lower main shaft by a synchronizer 54. A $2^{nd}$ gear driven gear 56 that engages the $2^{nd}$ gear input gear 22 is provided on the lower main shaft 50 and is selectively engageable thereto by a synchronizer 58. A $5^{th}$ gear driven gear 60 that engages the $3^{rd}/5^{th}$ gear input gear 24 is provided on the lower main shaft 50 and is selectively engageable thereto by a synchronizer 62. A $6^{th}$ gear driven gear 64 that engages the $6^{th}$ gear input gear 28 is provided on the lower main shaft 50 and is selectively engageable thereto by a synchronizer 66. The lower main shaft 50 includes an output gear 66 that can be in driving engagement with the output member such as the differential 48 (shown twice in FIG. 1 for illustration purposes to illustrate the engagement with the output gears 46 and 66).

Figure 2:
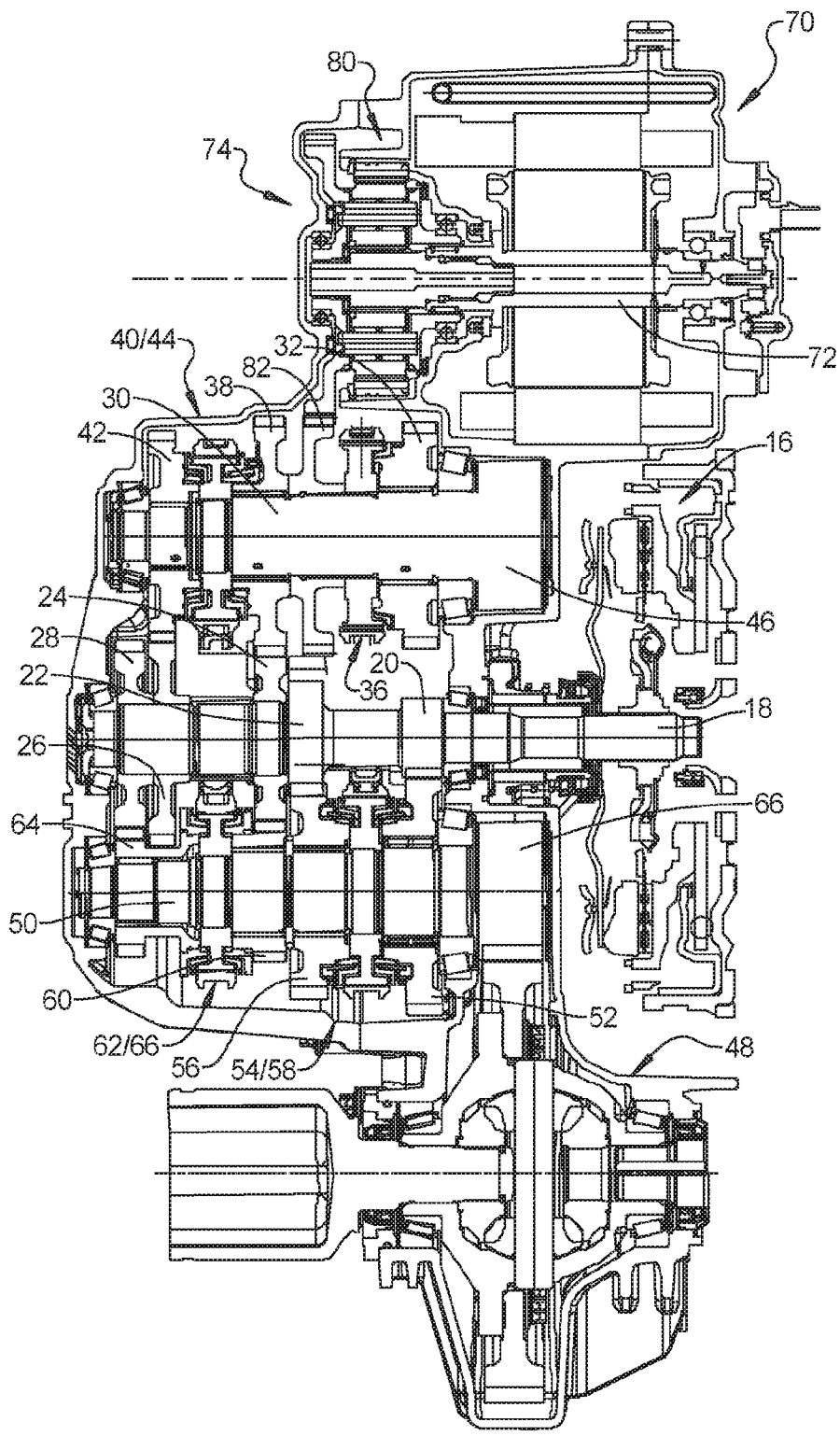
FIG. 2 is a schematic illustration in partial cross-sectional and fragmentary view of a manual transmission included in the powertrain of FIG. 1.
Figure 3:
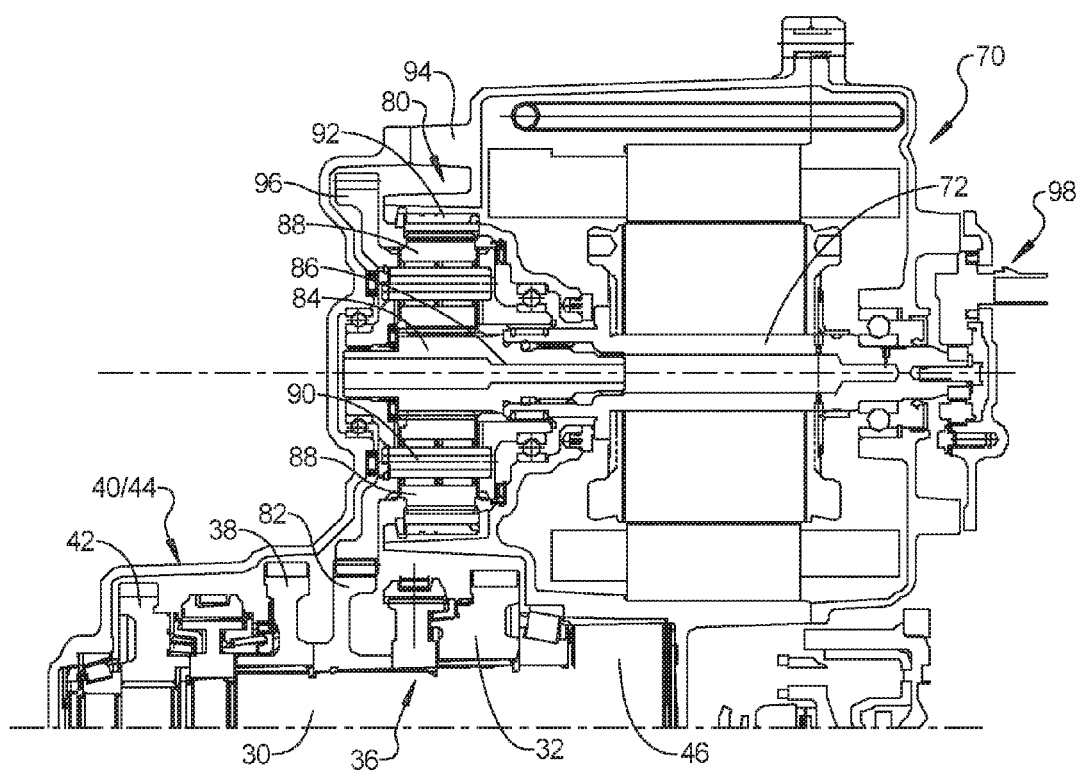
FIG. 3 is a schematic illustration of the electric motor and planetary gear set of the powertrain shown in FIG. 2.

An electric motor 70 includes a drive shaft 72 that is drivingly engaged with the output member 48 via a geared connection 74 that can include a disconnect feature 76. With reference to FIGS. 2 and 3, the geared connection between the drive shaft 72 of the electric motor 70 and the differential output member 48 can be in the form of a planetary gearset 80 that engages a transfer gear 82 on the upper main shaft 30. With particular reference to FIG. 3, the planetary gearset 80 can include a sun gear 84 formed on a shaft 86 that is splined to the motor drive shaft 72. The sun gear 82 is in driving engagement with a plurality of planetary gears 88 supported on a planetary carrier 90. The planetary gears 88 are also in engagement with a ring gear 92 that is fixed to a housing 94 of the manual transmission 14. A drive gear 96 is connected to the planetary carrier 90 and is engaged with the transfer gear 82. The transfer gear 82 is rotatably connected to the upper main shaft main 30 and thereby drives the output gear 46 for driving the differential 48. A motor resolver 98 is provided on an end of the motor drive shaft 72 for detecting a rotary position and speed of the drive shaft 72 of the electric motor 70. The motor resolver 98 can alternatively be provided on the shaft 86.

Figure 4:
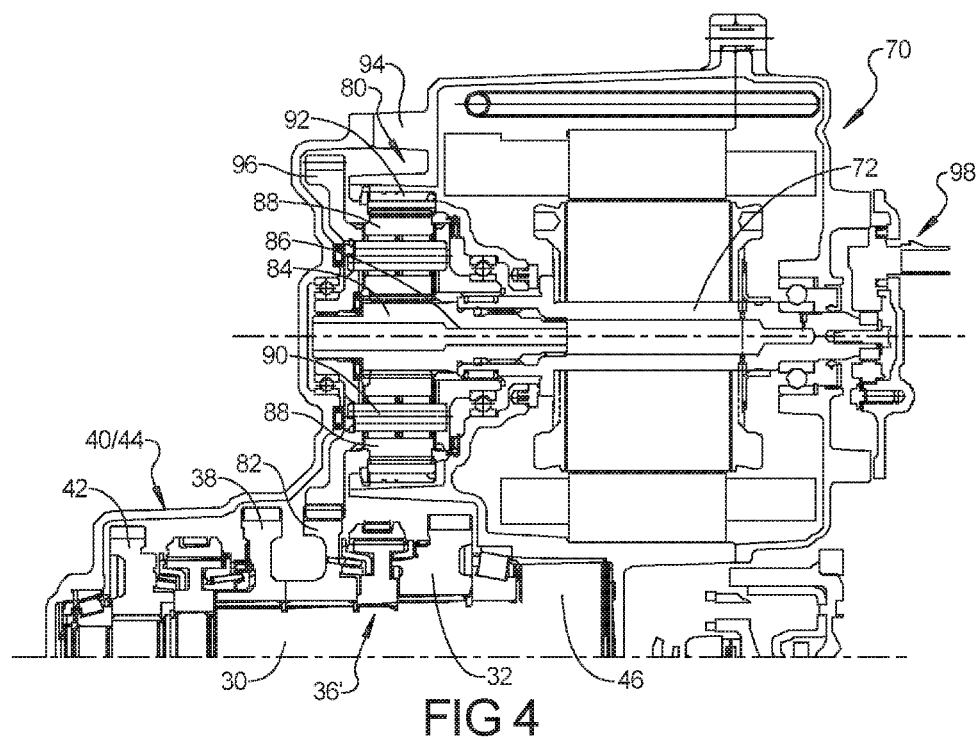
FIG. 4 is a schematic illustration of an alternative illustration of the electric motor and planetary gear set of the vehicle powertrain.

According to an alternative embodiment as shown in FIG. 4 wherein the same or similar reference numerals are used to represent the same or similar components, the transfer gear 82 can be detachably connected to the upper main shaft 30 by a synchronizer such as the double-sided synchronizer 36' that also engages the reverse gear drive gear 32 to the upper main shaft 30. The detachable transfer gear 82 allows the planetary gearset 80 and the electric motor 70 to be isolated from the manual transmission 14 when the transmission is being driven by the engine 12.

Figure 5:
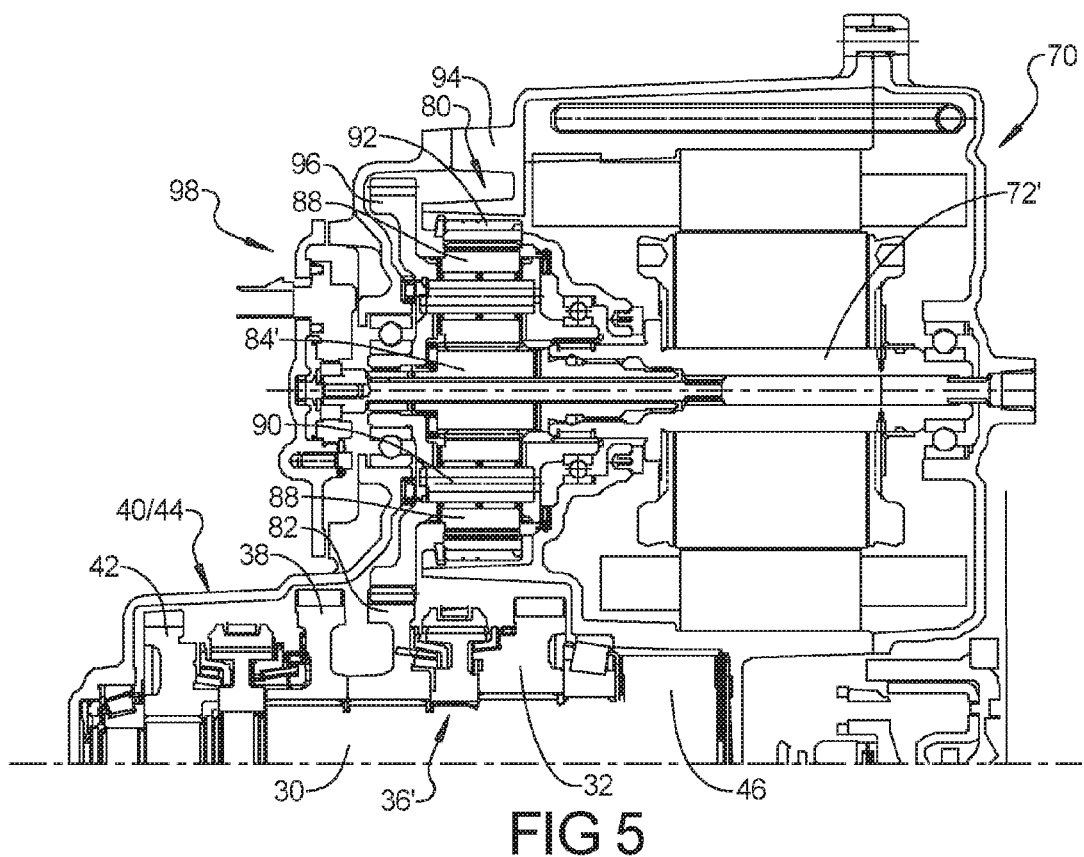
FIG. 5 is a schematic illustration of an alternative electric motor and planetary gear set of the vehicle powertrain.

As a further embodiment, as shown in FIG. 5, the sun gear 84' of the planetary gearset 80' can be integrally formed on the motor drive shaft 72'.

Figure 6:
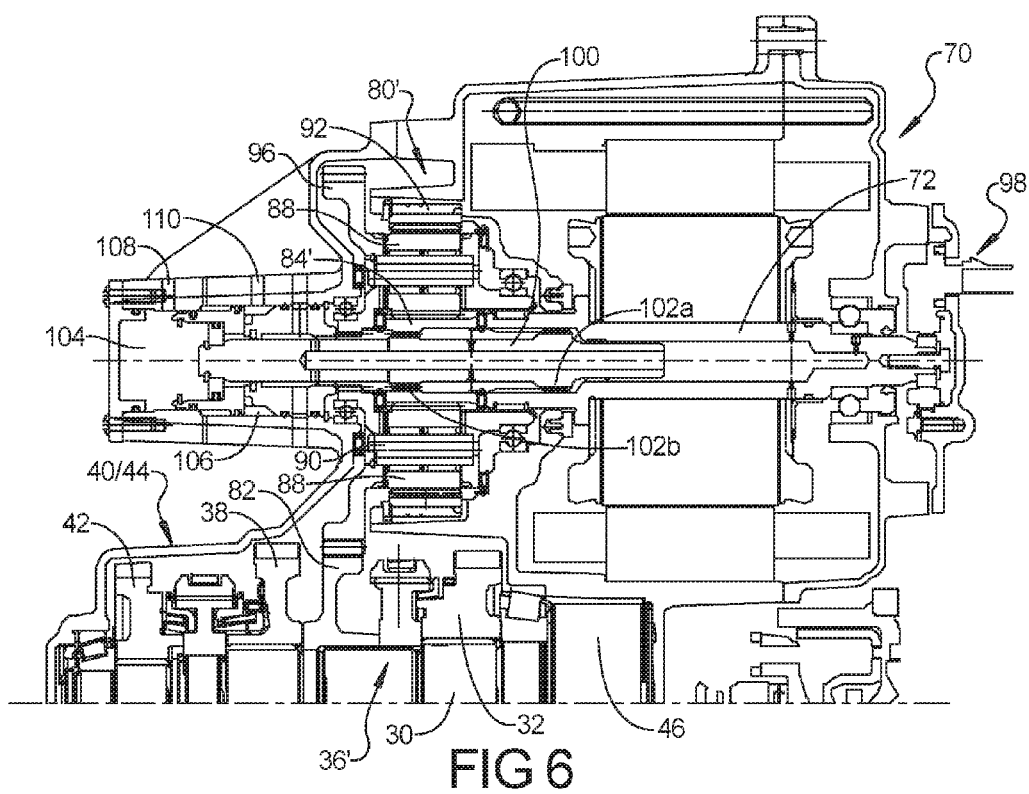
FIG. 6 is a schematic illustration of an alternative electric motor and planetary gear set of the vehicle powertrain.

Alternatively, as shown in FIG. 6, the planetary gear set 80' can be a multi-state planetary gearset including a direct, neutral and low operating state. In particular, a movable shaft 100 can be provided with dog clutch teeth 102a, 102b for directly connecting the motor drive shaft 72 to the drive gear 92 of the planetary gear set 80' in order to provide a direct drive state. The movable shaft 100 can also provide drive connection between the motor drive shaft 72 and the sun gear 84' in order to provide the low operating state with gear reduction through the planetary gear set 80'. The movable shaft 100 can also be movable to disconnect the motor drive shaft 72 from the planetary gear set 80'to provide a neutral state. The position of the movable shaft 100 can be adjusted by a pair of hydraulic chambers 104, 106 each having an oil input passage 108, 110. The hydraulic chambers 104, 106 are disposed on opposite sides of an actuator piston 112 connected to the movable shaft 100.

In the low range operating state, the dog clutch teeth 102a, 102b on the movable shaft 100 engage the motor drive shaft 72 and the sun gear 82 by supplying hydraulic fluid to the hydraulic chamber 104. In the direct drive operating state, the dog clutch teeth 102a, 102b on the movable shaft 100 engage the motor drive shaft 72 and the drive gear 92 by applying hydraulic fluid to the hydraulic chamber 106 and releasing fluid pressure to the hydraulic chamber 104. In the neutral state, the dog clutch teeth 102b on the movable shaft 100 are moved to an intermediate position between the interior dog clutch teeth of the drive gear 92 and sun gear 82'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle powertrain, comprising:
   an engine having a drive shaft;
   a manual transmission with an input shaft drivingly connected to the drive shaft and including a plurality of input gears, at least one main shaft including a plurality of driven gears engaged with the input gears and including an output gear;
   a differential drivingly engaged with the output gear; and
   an electric motor connected through a planetary gear set to a transfer gear on the at least one main shaft.

2. The vehicle powertrain according to claim 1, wherein the at least one main shaft includes a synchronizer for rotatably engaging the transfer gear to the at least one main shaft.

3. The vehicle powertrain according to claim 2, wherein the synchronizer is a double-sided synchronizer for selectively engaging the transfer gear and one of said driven gears to the at least one main shaft.

4. The vehicle powertrain according to claim 1, wherein the planetary gearset includes a direct drive state, a low range state and a neutral state.

5. The vehicle powertrain according to claim 4, wherein the planetary gearset includes a movable shaft that is engageable and dis-engageable with a motor drive shaft of the electric motor and is engageable and dis-engageable with a component of the planetary gearset.

6. The vehicle powertrain according to claim 5, wherein the component of the planetary gearset that is engageable and dis-engageable with the movable shaft is a sun gear and a planetary carrier of the planetary gearset is drivingly connected to the transfer gear.

7. The vehicle powertrain according to claim 5 wherein the movable shaft is hydraulically actuated to move axially for engaging the direct drive state, the low range state and the neutral state.

8. The vehicle powertrain according to claim 1, wherein the at least one main shaft includes a first main shaft having a first plurality of driven gears and a first output gear engaged with the differential and a second main shaft having a second plurality of driven gears and a second output gear engaged with the differential.

* * * * *